Dec. 4, 1951 A. BAKST ET AL Re. 23,435

CIGAR AND CIGARETTE LIGHTER

Original Filed May 12, 1945

INVENTORS
AARON BAKST
BY SIMON L. RUSKIN
Lackenbach & Siskind
ATTORNEYS

Reissued Dec. 4, 1951 Re. 23,435

UNITED STATES PATENT OFFICE 23,435

CIGAR AND CIGARETTE LIGHTER

Aaron Bakst, Flushing, and Simon L. Ruskin,
New York, N. Y.

Original No. 2,516,843, dated August 1, 1950, Serial No. 593,348, May 12, 1945. Application for reissue March 19, 1951, Serial No. 216,318

5 Claims. (Cl. 219—32)

Matter enclosed in heavy brackets [ ] appears in the original patent but forms no part of this reissue specification; matter printed in italics indicates the additions made by reissue.

Our invention relates to portable cigar and cigarette lighters, and more particularly to *portable electrically operated* [dry cell-operated] lighters.

It is the general object of the invention to provide a simple and compact cigar and cigarette lighter which is operated by a battery of small dry cells, and which is capable of functioning even when exposed to high winds, and is free from fumes and odors.

It is a further object of the invention to provide a cigar and cigarette lighter of the type indicated wherein means are provided for positioning and interconnecting a plurality of dry cells in side-by-side relation.

It is also an object of the invention to provide a battery-operated lighter in which an electric resistance element heated by the battery current can be withdrawn from the casing for use at a point remote from the latter whereby greater convenience in use is afforded, a cable of suitable length being connected with the resistance element and being normally coiled within the casing.

A still further object of the invention is to provide a battery-operated lighter wherein the electrical circuit is normally open but is automatically closed upon opening of the cover of the lighter.

Still another object of the invention is the provision of means for keeping the electrical circuit open when the control switch fails to function for any reason.

It is a further object of the invention to provide an improved mounting for an electrical heating unit which is of more general application and is suitable for use in electrically operated cigar and cigarette lighters, the heating unit and its mounting being united into a separate and separable structural unit whereby the heating coil may be easily and conveniently removed for repair or recompartment by means of a conducting spring placement and the repaired or new unit as easily and conveniently fitted on its support and connected in the electrical circuit.

In the accompanying drawing is shown a preferred embodiment of the invention. In said drawing, Fig. 1 is a vertical section through the lighter on an enlarged scale;

Fig. 5 is a plan view of the removable bottom wall of the casing; while

Figure 1:
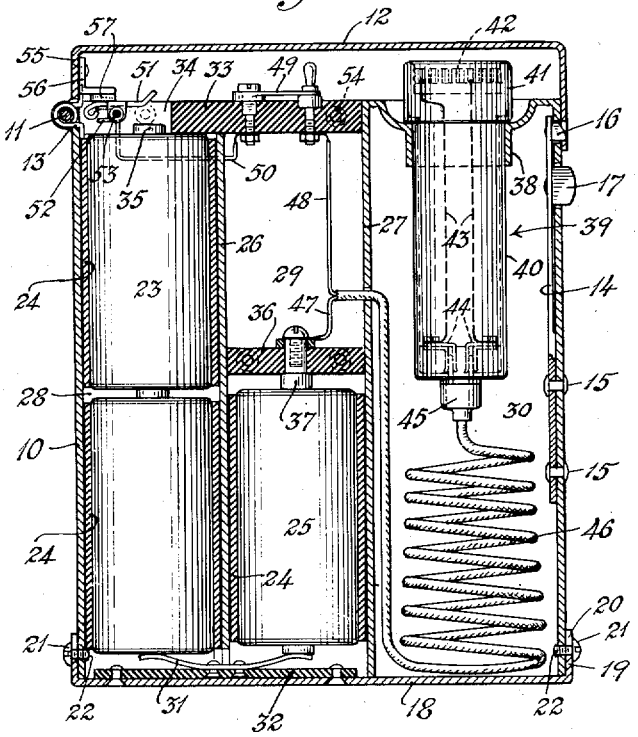
Figure 2:
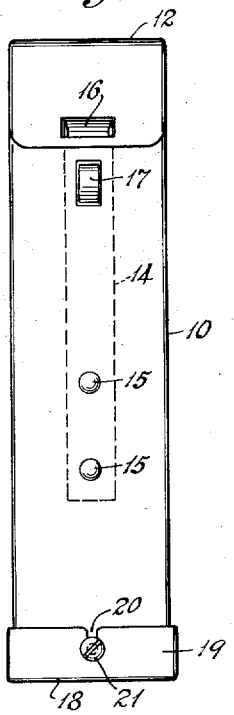
Fig. 2 is an end view of the lighter as shown in Fig. 1.
Figure 3:
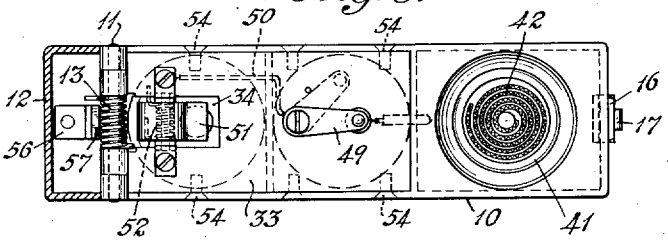
Fig. 3 is a top plan view of the lighter with the cover in the open position.

The casing of the lighter comprises a main body portion 10 of approximately rectangular cross section to which is pivoted, at 11, a cover 12, the latter being normally biased to the open position by a coil spring 13. The cover is held in a closed position against the action of spring 13 by a detent member in the form of a plate 14 secured upon the inside wall of the casing as by means of rivets 15 and provided at its upper end with a cam-faced lug 16 which is arranged to pass through registering openings in the casing wall and in the closed cover, as will be readily understood. The detent is released by means of a finger piece 17 which passes through a suitable opening in the casing wall. For reasons which will appear hereinafter, the bottom wall of the casing is separable from the main body of the casing itself, and as shown, is in the form of a plate 18 provided with a peripheral flange 19 having open-ended slots 20 adapted to receive the stems of screws 21 threaded into suitable openings in the vertical end walls of the casing 10. As will be obvious, upon loosening of the screws 21, the bottom wall 18, 19 can be removed from the casing to provide access to the interior of the latter. To prevent loss of the screws 21, their inner ends can be struck down as shown at 22.

The casing is internally constructed to receive a plurality of dry cells, and in the preferred form of the invention, the cells are arranged in at least two columns or files, instead of in the single file arrangement common in flashlights. The dry cells are preferably of the high ampere-hour type providing a potential of about four volts per cell. Each cell 23 has a metallic shell constituting one of its terminals and is provided with an insulating cover 24 of paper or the like. Three cells of this type connected in series are sufficient to provide the current for operating the resistance element of our lighter over quite a long period of time, and as shown in Fig. 1, two of these cells may be arranged in co-axial relationship. The third cell, shown at 25 is arranged laterally on the two-cell column and preferably in adjacent relation. To this end the interior of the casing is divided into three compartments by the partitions 26 and 27, the compartments being indicated at 28, 29 and 30. Two of these cells, as shown, are positioned in the compartment 28 while the cell 25 is located in the compartment 29 and is electrically connected with the cell in the adjacent member 31 secured to an insulating plate 32 which in turn is riveted to the bottom wall 18.

Extending across both of the compartments 28 and 29 toward the top of the casing 10 is an insulating plate 33 which forms a stop for the first or upper cell 23 in the compartment 28. The plate is provided with an aperture 34 into which the positive terminal 35 of the said first cell protrudes. The compartment 29 is similarly provided with an insulating stop plate 36 fixed intermediate its ends for limiting the inward movement of the cell 25. A contact member 37 is secured to the plate 36 in position to engage the metallic wall or negative terminal of the cell 25.

Figure 4:
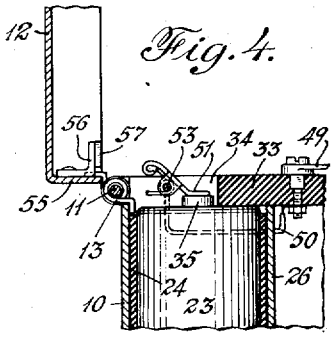
Fig. 4 represents a fragmentary view in vertical section.
Figure 5:
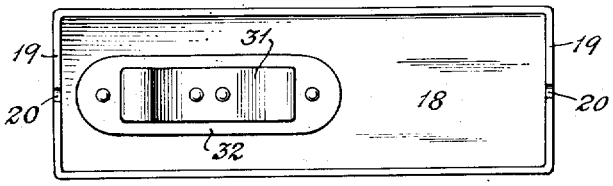

The third compartment 30 is provided at its upper end with a support 38 adapted to receive an electric resistance element which is indicated generally at 39. This element includes a stem portion 40 of sufficient length to be grasped conveniently with the fingers, and is of enlarged diameter at its upper end as shown at 41 to provide a shoulder which is adapted to engage the support 38. Within the member 41 there is arranged a high resistance element 42 which is adapted to become sufficiently heated with current from the battery to ignite a cigar or cigarette. The stem 40 including the upper portion 41 is made of heat resisting material such as clay or the like. The upper portion 41 is recessed so as to receive the coiled resistance element 42 whose ends are connected by conductors 43 with socket terminals 44. The latter are adapted to receive the prongs of a plug 45 connected to a length of cable 46 normally coiled within the bottom portion of the compartment 30 and terminating in a conductor 47 permanently connected to the contact member 37, and a conductor 48 connected to one terminal of a manually operable switch 49. The other terminal of such switch is connected by conductor 50 with a pivoted contact member 51 which, as shown in Fig. 4, is normally urged into engagement with the terminal 35 by means of a coiled spring 52. The contact 51 is fulcrumed on a rod 53 extending across the opening 34 in the insulating plate 33. The plates 33 and 36 are held in place by screws 54.

The cover or lid 12 is provided upon the inner face of its peripheral flange 55 and adjacent to the fulcrum 11 with a bracket 56 which is provided with an insulating plate or block 57 arranged to swing the contact member 51 to inoperative position upon closing of the cover 12. As will be evident, the contact member 51 and the switch 49 are in series, so that when the cover is closed the electric circuit is broken even if the switch 49 should be closed.

The manner of assembly and use of our improved lighter will be apparent from the foregoing. Upon removal of the bottom plate 18 the dry cells can be slipped into the compartments 28 and 29 and upon attaching the plate 18, the cells become connected in series. If the cover 12 is kept open during this replacement, the switch 49 will be opened to prevent heating of the resistance element 42. Upon closing of the switch 49, the lighter is ready for use and upon closing of the cover 12 the flow of current is interrupted. If for any reason the cover 12 should fail to close properly, the switch 49 can be opened to prevent running down of the battery.

While the whole lighter can be brought bodily to the end of a cigar or cigarette for igniting the same, it will frequently be more convenient to pull out the heater element 39 and hold only such element against the end of the cigar or cigarette. Such separation of the heating element from the body of the casing is permitted by the cable 46. It will be evident that the lighter will function satisfactorily even in a high wind and in all kinds of inclement weather. Aside from this advantage over fuel operated lighters, our improved lighter has a further advantage that no flame is held near the face, so that danger of burning of the skin or of the hair is eliminated. It will also be obvious that with our lighter no fumes of any kind will be drawn into the cigar or cigarette, as is the case with fuel operated lighters.

Figure 8:
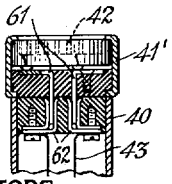
Figs. 6, 7 and 8 show modified forms for mounting and supporting a heating unit for convenient detachment.
Figure 6:
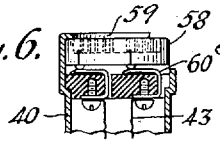
Figure 7:
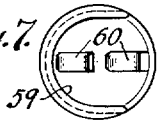

In the form of the invention shown in Fig. 1, the heating element 39 can be removed for replacement or repair by simple disengagement from the plug 45. In Figs. 6 to 8 there are shown two other satisfactory modes of detachably mounting the resistance element 42 which is of general application not only to the lighters of the present invention, but also to other electrically heated devices. In the form shown in Figs. 6 and 7, the latter being a plan view of Fig. 6 with the resistance element removed, the resistance element is coiled within a relatively thin refractory disc or the like 58; and when mounted on the tubular stem or member 40 it slides under and is retained by an over-hanging ledge or flange 59, the appearance and operation being very similar to those of a tubular coil bank. The member 58 is provided with terminals which in the normal position of said member maintain electrical contact with spring terminals 60 suitably positioned on insulating material within the stem 40 and electrically connected to the conductors 43. The latter may be connected to socket members 44 as in Fig. 1, or they may be more or less permanently connected to the cable 46. It will be evident that the spring terminals 60 act to urge the member 58 against the under side of the ledge 59 to hold said member against displacement. However, other securing devices can be employed together with or in place of the spring action of the terminals 60. It will be seen that although the stem 43 can be readily grasped between the fingers to remove the same from the casing 10 without interfering with the positioning of the member 58, the latter can be easily slid out of the stem 40 for repair or replacement. Thus, it becomes unnecessary to disassemble the whole lighter (or other heating device of which the separable resistance element forms a part) to remove the resistance element and its immediate support; nor does the whole device have to be transported to a repair shop for replacing the resistance element or for fitting a new member 48 to the device.

The structure shown in Fig. 8 employs a plug and socket connection between the separable resistance element and its immediate mounting, and the stem 40. This type of connection will be preferred in arrangement wherein it is inconvenient to slide a repaired or a new resistance element into position from the side. In this form of the invention, the enlarged top portion 41' of the stem 40 is separate from the main body of the stem and supports the resistance coil 42 upon a suitable refractory member as in Fig. 6. Terminals are connected with the ends of the resistance coil which engage the laterally bent ends of prongs 61 projecting through suitable insulation, below the bottom of the portion 41. The prongs are adapted to be received within socket terminals 62 connected to the conductors 43. It will be understood that the friction between the prongs 61 and their sockets is considerably greater than the friction between the stem 40 and its socket 68 so that the parts 41', 40 may be withdrawn from the casing 10 as a unit without separating the parts 40 and 41'. If desired, however, parts 40 and 41' may be provided with releasable fastening devices to prevent their separation in the normal use of the device. The upper edges of the member 41', assuming that the latter is made of metal, can be bent over to hold the resistance coil with its refractory support in place where it is made of non-flexible material suitably fastening devices made, if desired, to be utilized to fix the refractory disc in place.

The tubular stem 40, 41 or 40, 41' can be made of metal or of refractory or plastic material. The casing with its cover and bottom plate or wall can be made of metal or of various plastics of preferably non-combustible material.

As will be obvious to those skilled in the art, numerous variations from the preferred invention herein described may be resorted to within the scope of the appended claims without departing from the spirit of the invention.

We claim:

1. A portable cigar and cigarette lighter comprising a casing divided by partitions into three laterally disposed compartments, dry cells fixedly located in two adjoining compartments, a conducting member connecting the positive terminal of a dry cell in one compartment with the negative terminal of a dry cell in the other adjacent compartment, an electric resistance element disposed in the third compartment in insulated relation with respect to the casing, electric conductors connecting the resistance element with the dry cell battery, a movable contact member controlling the electric circuit, and means for causing the contact member temporarily to close to effect heating of the resistance element, said electric resistance element being manually removable from the casing, the electrical conductors between the resistance element and the battery including a cable of sufficient length to enable the said element to be removed a considerable distance from the casing, the cable being coiled within the third compartment when the resistance element is in position in the casing.

*2. A portable cigar and cigarette lighter comprising a casing divided into laterally disposed compartments, a self contained source of electric current fixedly located in one of said compartments, an electric resistance element disposed in another compartment in insulated relation with respect to the casing, electric conductors connecting the resistance element with the current source, a movable contact member controlling the electric circuit and means for causing the contact member temporarily to close to effect heating of the resistance element, said electric resistance element being manually removable from the casing, the electrical conductors between the resistance element and the current source including a cable of sufficient length to enable the said element to be removed a considerable distance from the casing, the cable being within one of the compartments when the resistance element is in position in the casing.*

*3. A portable cigar and cigarette lighter comprising a casing partitioned into a plurality of laterally disposed compartments, an electric cell fixedly located in one of the compartments, an electric resistance element disposed in another compartment in insulated relation with respect to the casing, electrical conductors connecting the resistance element with the electric cell, a movable contact member controlling the electric circuit and means for causing the contact member temporarily to close to effect heating of the resistance element, said electric resistance element being manually removable from the casing, the electrical conductors between the resistance element and the electric cell including a cable of sufficient length to enable the said element to be removed a considerable distance from the casing, the cable being within a compartment when the resistance element is in position in the casing.*

*4. A portable cigar and cigarette lighter comprising a casing, a self contained source of electric current fixed within said casing, an electric resistance element normally disposed within the casing in insulated relation with respect thereto, electrical conductors connecting the resistance element with the source of electric current, a movable contact member controlling the electric circuit, means for causing the contact member temporarily to close to effect heating of the resistance element, said electric resistance element being manually removable from the casing, the electrical conductors between the resistance element and the current source including a cable of sufficient length to enable the said element to be removed a considerable distance from the casing, the cable being within the casing when the resistance element is in position in such casing.*

*5. A portable cigar and cigarette lighter comprising a casing divided into laterally disposed compartments, a self-contained source of electric current fixedly located in one of said compartments, an electric resistance element disposed in another compartment in insulated relation with respect to the casing, electric conductors connecting the resistance element with the current source, a movable contact member controlling the electric circuit and means for causing the contact member temporarily to close to effect heating of the resistance element, said electric resistance element being manually removable from the casing, the electrical conductors between the resistance element and the current source including means to enable the said element to be removed a considerable distance from the casing, said last means being disposed within one of the compartments when the resistance element is in position in the casing.*

AARON BAKST.
SIMON L. RUSKIN.

REFERENCES CITED

The following references are of record in the file of this patent or the original patent:

UNITED STATES PATENTS

| Number | Name | Date |
|---|---|---|
| 1,537,577 | Berg | May 12, 1925 |
| 1,721,203 | Bucknell, Jr., et al | July 16, 1929 |
| 1,728,292 | Lavick | Sept. 17, 1929 |